United States Patent [19]

Kerscher et al.

[11] 4,276,261

[45] Jun. 30, 1981

[54] POLYMERIZATION APPARATUS AND PROCESS

[75] Inventors: Frederick C. Kerscher, Tallmadge; John J. Nowacki, Akron, both of Ohio

[73] Assignee: The Goodyear Tire & Rubber Company, Akron, Ohio

[21] Appl. No.: 57,781

[22] Filed: Jul. 16, 1979

[51] Int. Cl.[3] .............................. C08F 2/36; B01J 8/08
[52] U.S. Cl. .................................. 422/131; 422/138; 422/216; 422/232; 414/288; 414/299; 528/497; 222/459
[58] Field of Search ................ 528/497; 422/131, 138, 422/232, 216, 219, 222; 414/150, 160, 167, 169, 288, 299; 222/459

[56] References Cited

U.S. PATENT DOCUMENTS

| | | | |
|---|---|---|---|
| 3,129,063 | 4/1964 | Zirngibl | 422/233 X |
| 3,561,927 | 2/1971 | Jones, Jr. | 422/216 |
| 3,920,624 | 11/1975 | Humkey et al. | 422/131 |

Primary Examiner—Michael S. Marcus
Attorney, Agent, or Firm—J. P. Ward

[57] ABSTRACT

This invention relates to a solid state polymerization apparatus comprising a vertically oriented tube through which particulate resin flows downwardly in a plug flow fashion to the cone-shaped bottom portion of the reactor. The apparatus contains as an improvement a resin distribution means in the top portion thereof to distribute added resin in an orderly fashion to maintain a uniform level of polymer and also a double cone perforated gas distribution means in the bottom thereof to prevent backmixing and assure that a uniform plug flow condition is maintained as the polymer descends down the apparatus to a discharge valve at the bottom thereof.

2 Claims, 2 Drawing Figures

POLYMERIZATION APPARATUS AND PROCESS

TECHNICAL FIELD

The solid state polymerization of low molecular weight polyester resins is well-known and various methods are used. One method is the fluidized bed process in which the resin is contacted with an inert gas at a gas velocity sufficient to fluidize the resin and to remove volatile materials formed during the polymerization. Another method which is used is a batch process in which a bed of resin granules is formed in the polymerization apparatus and gas passed through the bed at a velocity insufficient to raise or fluidize the bed and tumble them in the apparatus, but sufficient to allow volatile materials to escape. A third method is the continuous moving bed or gravity flow process wherein a bed or column of polymerizing resin moves, by gravity, downwardly through a vertically dispersed polymerization apparatus while an inert gas is passed through said moving bed in a countercurrent direction at a velocity insufficient to raise or fluidize the bed but sufficient to remove volatile materials. The depth or height of the moving column of resin is maintained essentially constant by the continuous addition of low molecular weight feed resin and withdrawal of high molecular weight product resin respectfully at essentially equivalent rates. One disadvantage of this latter method is that distribution of the feed resins across the top of the column of polymerizing resin and the plug flow of the resin column itself down the polymerization apparatus is not uniform which gives rise to wide variations in intrinsic viscosity between individual particles of resin in any given cross sectional plane of said column of resin and in the final resin product. Such variation in resin particle to particle intrinsic viscosity can adversely effect the subsequent processing of said resin and the commercial acceptability of films, fiber and other products produced therefrom.

SUMMARY OF THE INVENTION

The present invention relates to an improved polymerization apparatus for the continuous gravity flow solid state polymerization of particulated low molecular weight polyester resin to high molecular weight polyester resin. More particularly, the invention relates to an improved vertically disposed tubular gravity flow reaction apparatus in which is contained a downwardly flowing column of polymerizing polyester resin maintained at a substantially constant depth or height by the continuous addition to said apparatus of low molecular weight polyester resin and continuous withdrawal from said apparatus of high molecular weight polyester resin, said continuous addition and withdrawal being carried out at essentially equivalent rates wherein the improvement comprises equipping said apparatus with, and in combination, an internal resin distribution means in the upper portion of said apparatus and an internal flow regulating means in the lower portion of said apparatus. The combination of the resin distribution means and flow regulating means assures even dispersement of the low molecular weight polyester resin across the top surface of the polymerizing column of resin and uniform gravity plug flow of individual layers of polymerizing resin particles down the polymerization apparatus minimizing the variation in intrinsic viscosity from particle to particle heretofore associated with the use of such apparatus.

DETAILED DESCRIPTION

Figures 1, 2:
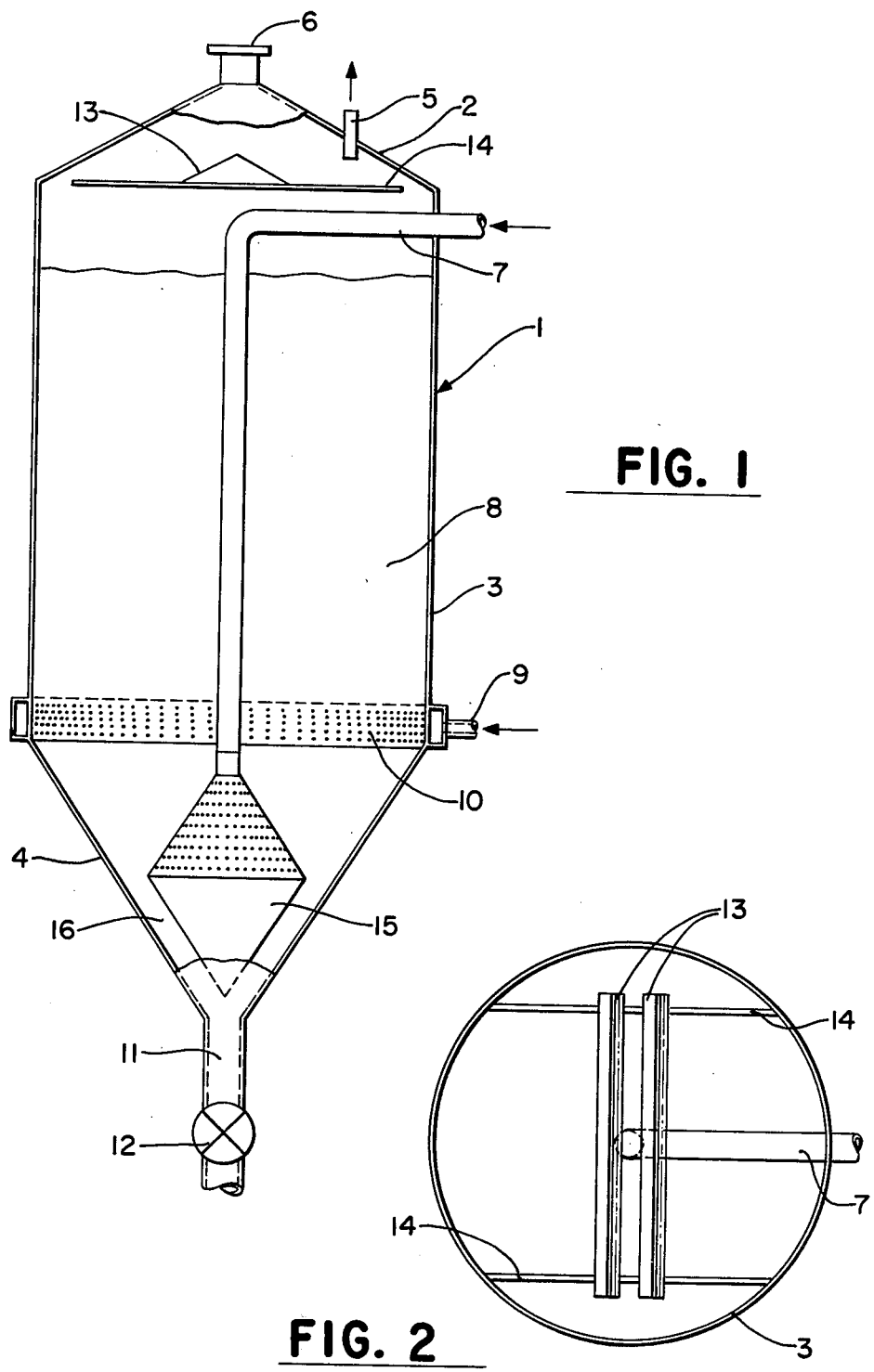

Referring to FIG. 1 which is illustrative of the gravity flow, continuous solid state polymerization apparatus to which the present invention is applicable, said apparatus being generally indicated as 1 and comprised of a top member 2 having a gas outlet means 5 and resin inlet means 6, a substantially vertically disposed tubular member 3 comprised of a continuous cylindrical sidewall of uniform circumference, a first gas inlet means 7 located in the upper portion of said tubular member 3 and above top surface of a column of polymerizing resin 8, said first gas inlet means extending perpendicularly out from the inner portion of the cylindrical sidewall of the tubular member 3 and horizontally with the top surface of said column of polymerizing resin 8 to the longitudinal axis of said apparatus and then downwardly on said axis and through said column of resin 8 and ending in a terminus on a plane bisecting the bottom of said tubular member 3 and a second gas inlet means 9 attached to a peripheral gas distributions means 10 located in the bottom of said tubular member 3 and following a circumferential path around the bottom of said tubular member 3 and a conical bottom member 4 having a resin outlet 11 leading to a rotary discharge valve 12. The improvement to said apparatus 1 comprising the present invention herein, consists of in combination a resin distribution means 13 located in said top member 2 and fixedly mounted perpendicularly to and centered on the longitudinal axis of apparatus 1 above said gas inlet means 7, and the top surface of the column of polymerizing resin 8 by means of support members 14 located in and attached to the uppermost portion of tubular member 3 and a flow regulating means 15 located in the conical bottom member 4 and above resin outlet 11.

The resin distribution means 13 comprises a fixed baffle arrangement on support means 14 located in and attached to the uppermost portion of tubular member 3 and above gas inlet means 7 and which fixed baffle arrangement provides for an even distribution of resin entering the top of the apparatus through resin inlet means 6 across the top of the column of polymerizing resin. FIG. 2 is a drawing of a preferred embodiment wherein the baffle arrangement consists simply of at least two angle iron shaped bars 13 and 13a located directly under resin inlet means 6 and perpendicular to the axis of the polymerization apparatus 1 and attached to support rods 14 and 14a attached to tubular member 3. Maximum even distribution of resin across the top of the polymerizing column of resin is obtained when the baffle arrangement is positioned at a ninety degree angle to the horizontal portion of gas inlet means 7 as shown in FIG. 2. Other distribution means such as, for example, round bars on a single inverted cone wherein the apex thereof is directed toward resin inlet 6 are also useful in evenly distributing the resin entering the top of the apparatus and are included within the spirit and scope of the present invention.

The flow regulating means 15 comprises a singular baffle arrangement of two cones, an upper and lower cone, said cones being fixedly attached to the terminus of gas inlet means 7 through the apex of the upper cone and to each other at their bases. The sides of the upper cone have a series of uniformly spaced perforations to allow gas entering through gas inlet means 7 to pass through said upper cone and countercurrently to the downwardly flow of the column of polymerizing resin 8. The lower cone of said singular baffle arrangement comprising flow regulating means 15 is characterized by having solid sides which in combination with the conical bottom member 4 forms a uniform annular channel 16 wherein the distance between the sides of said lower cone and the conical bottom member forming said uniform annular channel ranges from about one-fourth to about one-sixth the diameter of tubular member 3. In addition, the maximum diameter of low regulating means 15, measured at the point where the two cones are joined, i.e. at the bases of said cones, will range from about one-fourth to one-half the diameter of tubular member 3.

In operating the apparatus, the apparatus is filled with granules of a resin such as low molecular weight polyethylene terephthalate. Polymer granules are fed through the inlet port 6 of the apparatus where they contact the resin distribution means 13 which evenly distributes the polymer granules over the surface of the column of polymer granules 8 already in the apparatus. A portion of the nitrogen gas is passed into the reactor through gas inlet means 7 and is distributed into the column of polymerizing resin 8 through the perforated upper cone of the double cone flow regulating means 15 attached to the terminus of gas inlet means 7. The nitrogen moves countercurrent to the flow of the column of polymerizing resin and is withdrawn from the apparatus through gas outlet means 6 in the top member 2 of the apparatus. The granules of resin descend through the apparatus 1 in a uniform plug flow condition and remain in said plug flow conditions as they pass between the double cone 15 and the wall of the reactor adjacent thereto and exit through resin outlet 11 into rotary valve 12, which moves the resin on to storage or other processing.

EXAMPLE OF THE PROCESS

Polyethylene terephthalate granules in the form of cubes having a size of approximately 0.3–0.5 centimeters are fed into the top of the reactor and evenly distributed by the distributor over the surface of the polymer already in the reactor at the rate of about 1500 kg. per hour and an intrinsic viscosity of 0.60. The volume of the reactor is such that the amount of resin held up in the reactor is about 15,000 kg. The resin is retained in the reactor for a 10 hour residence period. That is, the resin takes about 10 hours to move from the top of the reactor through the outlet port at the bottom. Plug flow is maintained in the system by means of the double cone. The reactor is jacketed with hot oil maintained at a temperature of about 225°–240° C. The polymer at the top of the reactor has a temperature of about 190°–210° C. and ranges to 200°–220° C. at the bottom of the reactor. Nitrogen gas is circulated under slightly positive pressure and the reactor is maintained at essentially atmospheric pressure. The nitrogen gas exits at the top of the reactor. Resin exiting at the bottom of the reactor has an intrinsic viscosity of about 0.72.

The temperature of the reactor can be varied somewhat. Of course, variations in temperature will affect the intrinsic viscosity obtained or the residence time in the reactor. The flow of nitrogen or other gas can be varied from 2.0 standard cubic meters per minute to 30.0 standard cubic meters per minute. In the example above, the nitrogen was passed to a recovery system and reused in the process.

In the illustration of the process of the invention set out above, polyethylene terephthalate having an intrinsic viscosity of about 0.6 is polymerized to resin having an intrinsic viscosity of about 0.7. Those familiar with this art will recognize that the starting intrinsic viscosity can be varied widely and can be from about 0.2 to about 0.7 as determined in a 60/40 phenol tetrachloroethylene mixed solvent. The final intrinsic viscosity can be about 1.0 or higher. Of course, the residence time will be varied in accordance with the starting and final intrinsic viscosity.

The particle size of the resin used in the invention can also be varied widely. It can be in the form of pellets, cubes or can be very finely divided.

While certain representative embodiments and details have been shown for the purpose of illustrating the invention, it will be apparent to those skilled in this art that various changes and modifications may be made therein without departing from the spirit or scope of the invention.

We claim:

1. In a substantially vertically disposed tubular gravity flow reaction apparatus for the continuous solid state polymerization of particulated low molecular weight polyester resin to high molecular weight polyester resin, said apparatus containing a continually downwardly flowing column of polymerizing polyester resin maintained at an essentially constant level by the continuous addition of low molecular weight resin to the apparatus at a rate essentially equivalent to the rate of continuous withdrawal of high molecular weight resin from the apparatus, and wherein said apparatus comprises a casing consisting of a. a top member having a gas outlet means and a low molecular weight resin inlet means to allow continuous addition of said resin to said apparatus;
   b. an elongated tubular member comprising a continuous cylindrical sidewall of uniform circumference and having a first gas inlet means located in the upper portion of said tubular member extending perpendicularly from the cylindrical sidewall defining said tubular member to the longitudinal axis of the apparatus and then downwardly on said axis and through the column of polymerizing resin and ending in a terminus in the lower portion of said tubular wherein fixedly attached to said terminus of said first gas inlet means is a conical distribution means and a second gas inlet means attached to a peripheral gas distribution means located in lower portion of said tubular member; and
   c. a conically shaped bottom member having a high molecular weight resin outlet means to allow for continuous withdrawal of the resin from said apparatus;

the improvement which comprises means for preventing or minimizing back-mixing of particulate resin in said column of polymerizing resin and thereby maintaining said continually moving column of resin contained in said apparatus in a substantially uniform and plug flow condition from the upper portion of said apparatus to the lower portion thereof to prevent or minimize back-mixing of particulate resin in said column of polymerizing resin said means consisting of in combination d. a resin distribution means located in said top member and fixedly mounted perpendicular to and centered on the longitudinal axis of said apparatus below said resin inlet means and above said first gas inlet means and the surface of said column of resin on support means located in and attached to the uppermost portion of said elongated tubular member to distribute the low molecular weight resin added through said inlet means evenly across the top of the column of resin in said apparatus; said resin distribution means comprising at least two angle iron shaped bars, said bars being spaced apart from one another and affixed to the support means such that the apexes of said bars are directed upwardly toward the resin inlet means, said bars further being positioned at a ninety degree angle to the horizontal portion of said first gas inlet means; and e. a flow regulating means located in the conical bottom member of said apparatus and above the high molecular weight resin outlet means therein, said regulating means comprising a singular baffle arrangement of two cones, an upper cone and a lower cone, said cones being fixedly attached to the terminus of the first gas inlet means through the apex of the upper cone and to each other at their bases, said upper cone having a series of spatially arranged perforations to allow gas entering through the first gas inlet means to pass through said cone and upwardly and countercurrently to the downwardly flow of the column of polymerizing resin and said lower cone having solid sides which form a uniform annular channel between the lower cone of said regulating means and the conical bottom member of the reaction apparatus wherein the distance between the sides of the lower cone of said flow regulating means and the conical bottom member of the reaction apparatus forming said uniform annular channel ranges from about one-fourth to one-sixth the diameter of the tubular member of said apparatus.

2. The improvement of claim 1 wherein the flow regulating means comprising a singular arrangement of two cones fixedly attached to each other at their bases has a maximum diameter ranging from about one-fourth to one-half the diameter of the tubular member of said apparatus as measured at the bases of said cones.

* * * * *